Jan. 17, 1967   J. A. HERRMANN ET AL   3,299,391
2 WIRE AND 3 WIRE NO FUSE ELECTROSTRIP RECEPTACLE
Filed March 9, 1964   3 Sheets-Sheet 1
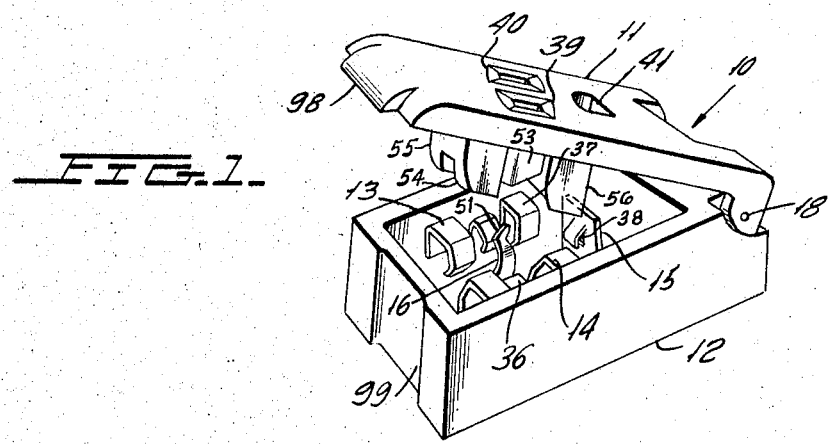
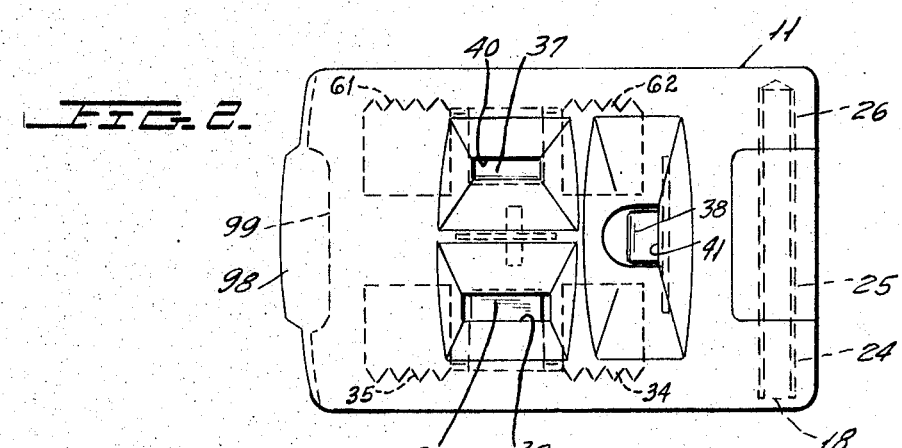
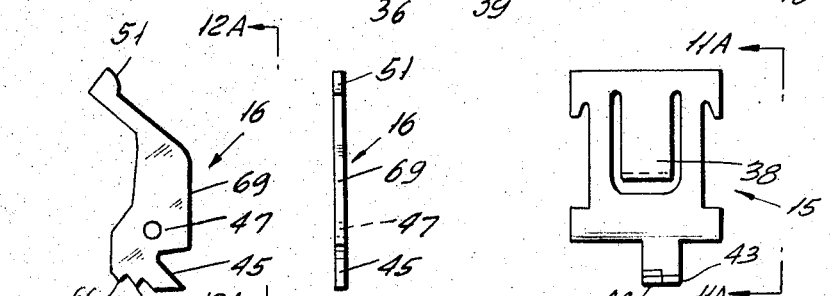
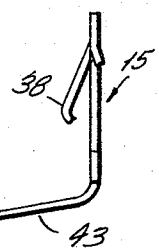
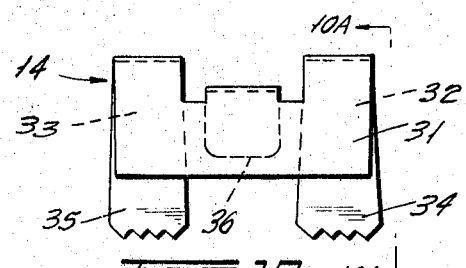
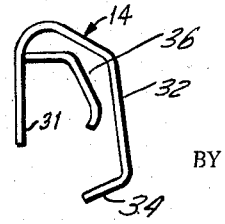
INVENTORS
JOHN A. HERRMANN
RUSSELL S. DAVIS
RALPH C. CLEMENT
BY
OSTROLENK, FABER, GERB & SOFFEN
ATTORNEYS

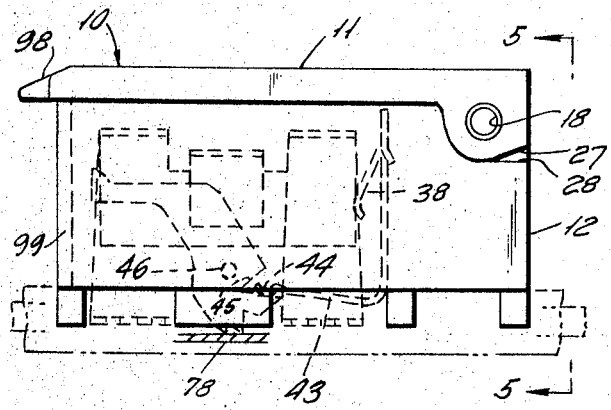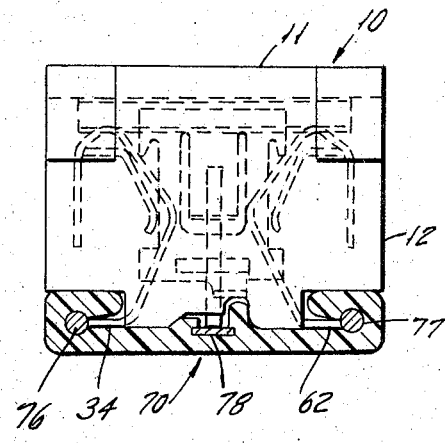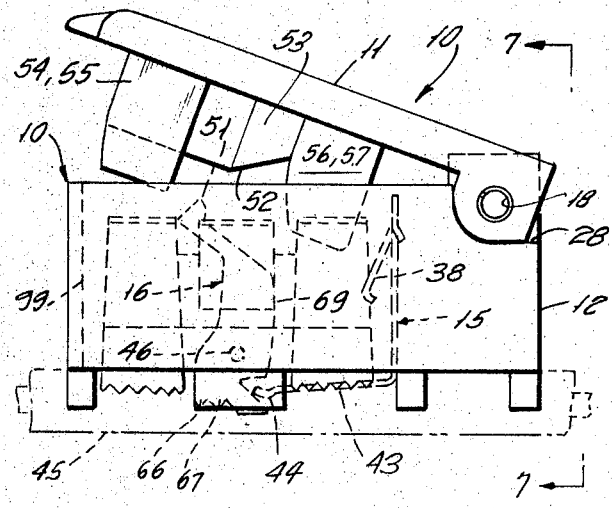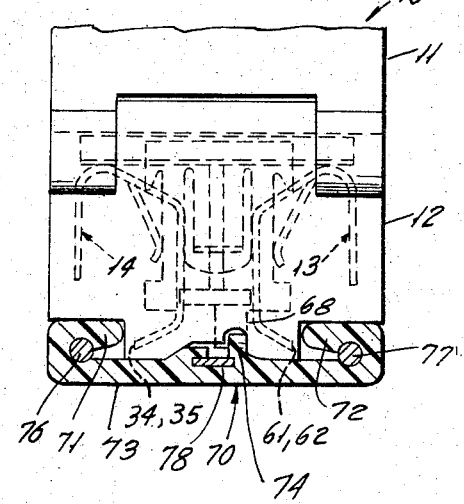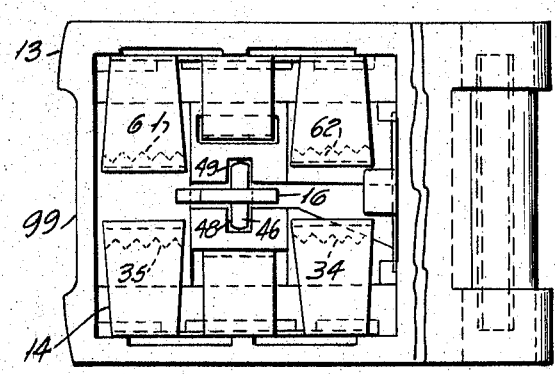

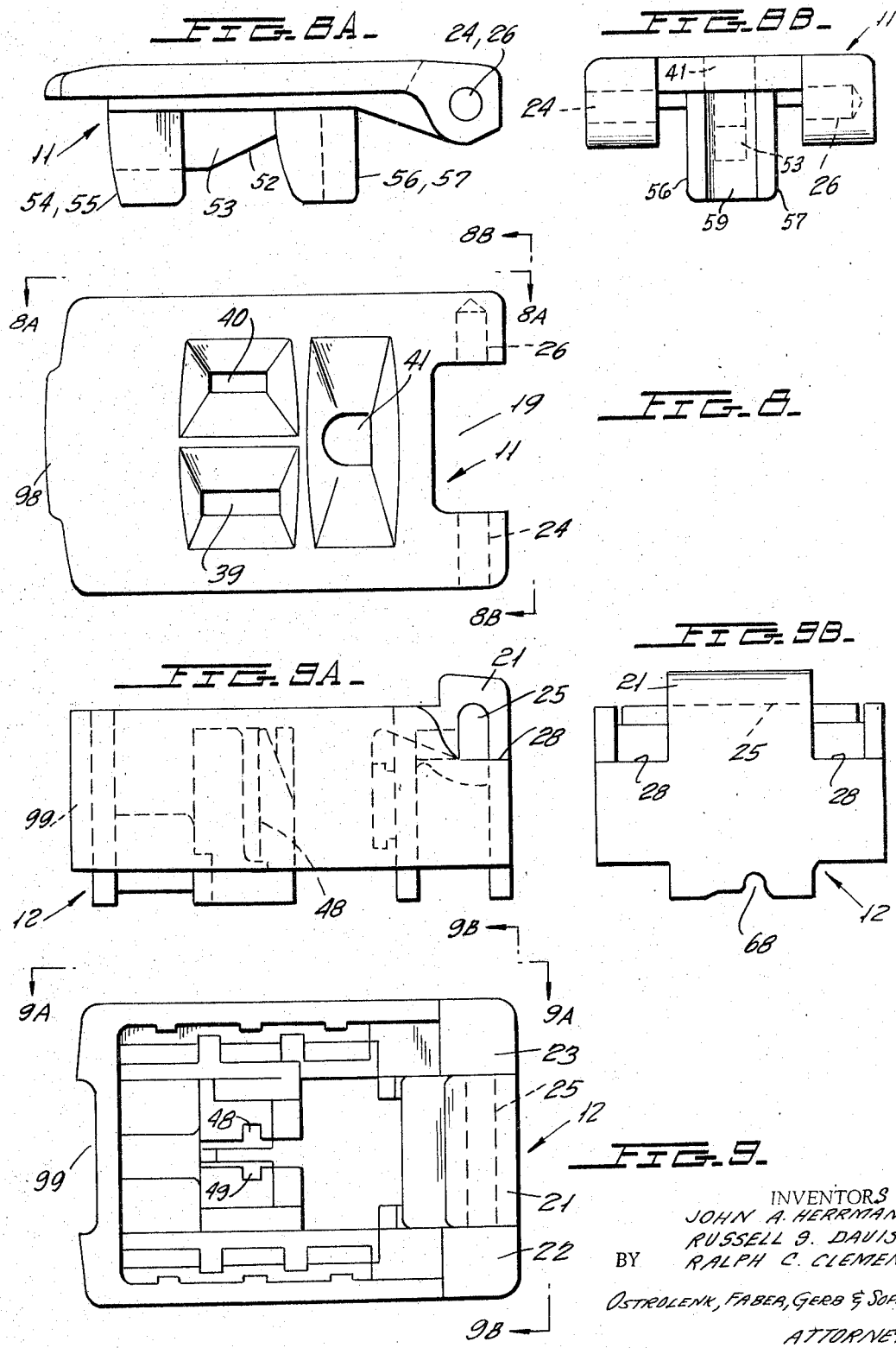

United States Patent Office 3,299,391
Patented Jan. 17, 1967

3,299,391
2 WIRE AND 3 WIRE NO FUSE ELECTROSTRIP RECEPTACLE
John A. Herrmann, Grosse Pointe Farms, Russell S. Davis, Detroit, and Ralph C. Clement, Mount Clemens, Mich., assignors to I-T-E Circuit Breaker Company, Philadelphia, Pa., a corporation of Pennsylvania
Filed Mar. 9, 1964, Ser. No. 350,152
8 Claims. (Cl. 339—14)

This invention relates to electrical receptacles in general and more particularly to a novel receptacle utilized with a continuous outlet cable.

U.S. Patent No. 2,924,804, issued Feb. 9, 1960, to W. H. Frank et al., entitled Electric Distribution System, illustrates a continuous outlet duct or cable construction in which there is a flat plastic body strip having inwardly turned lips along the longitudinal edges thereof with longitudinally extending conductors imbedded beneath the lips. The lips are closely spaced from the body of the strip so as to provide a pair of continuous longitudinally extending openings through which power may be tapped from the conductors at any point along the length of the strip. The strip is also provided with an integrally formed longitudinally extending projection or polarizing rib disposed in an off center position between the lips. The continuous outlet cable described above is a two-wire unit.

For some applications it is desirable to provide a third, or grounding, conductor. Such a conductor is conveniently imbedded in the main body of the strip and positioned adjacent to the polarizing rib with the surface of the grounding conductor being exposed. Such a construction is illustrated in abandoned U.S. patent application Ser. No. 754,079, filed Aug. 8, 1958, in the name of J. B. Cataldo et al., entitled Three Wire Electric Distribution System, and assigned to the assignee of the instant invention.

For the most part removable receptacles for this type of continuous outlet cable have consisted of either a so-called twist type receptacle or a so-called lever type receptacle. The former receptacle is of a type illustrated in U.S. Patent No. 2,946,037, issued July 19, 1960, to E. T. Platz et al., and entitled Electric Receptacle, while the latter type receptacle is of a type illustrated in U.S. Patent No. 2,924,802, issued Feb. 9, 1960, to E. T. Platz et al., and entitled Electric Receptacle.

Prior art constructions of both types have been less than satisfactory in that dimensional variations made it extremely difficult to consistently maintain good electrical contact with the conductors of the continuous outlet cable. In addition, since both types of receptacles utilized spring contact elements, quite often when an attachment plug cap was jerked from the receptacle, the receptacle contacts yielded and the receptacle was pulled loose from the continuous outlet cable.

The latter problem was even more pronounced in the lever type receptacle in that the jerking of the plug cap often caused the lever to move to open position. As a result, the twist type receptacle was often favored over the lever type receptacle even though the twist type was more expensive to manufacture and was, for an inexperienced person, difficult to attach to the continuous outlet cable.

The instant invention provides a novel construction for a lever type receptacle which eliminates the problems hereinbefore noted. Secure attachment to the continuous outlet cable is assured by a double contact arrangement with each of the hot or side conductors of the cable. The otherwise bad effects of dimensional variations are compensated for by providing a grounding arrangement wherein the grounding contact of the receptacle is biased into engagement with a pivoted grounding cam having teeth for scraping dirt from and thereafter engaging the grounding conductor of the cable. The grounding cam pivot is free floating in slot means of the receptacle case to compensate for dimensional variations.

Accordingly, a primary object of the instant invention is to provide a novel construction for a detachable receptacle utilized in a continuous outlet cable system.

Another object is to provide a receptacle of this type which is less expensive to manufacture and is more reliable in operation than prior art receptacles of this type.

Still another object is to provide a receptacle of this type having a double contact for engagement with each of the continuous outlet cable side conductors.

A further object is to provide a novel lever type receptacle having a grounding contact means.

A still further object is to provide a novel grounding contact means for a receptacle which is mountable to and detachable from a continuous outlet cable.

These as well as other objects of this invention shall become readily apparent after reading the following description of the accompanying drawings in which:

FIGURE 1 is a perspective illustrating a receptacle constructed in accordance with the teachings of the instant invention shown with the lever in open position and internal contact positioning housing formations omitted for the sake of clarity.

FIGURE 2 is a plan view of the receptacle of FIGURE 1 with the lever in closed position.

FIGURE 3 is a plan view of the receptacle with the lever in open position and partially cut away.

FIGURE 4 is a side elevation of the receptacle mounted to a continuous outlet cable with the lever in closed position.

FIGURE 5 is an end view looking in the direction of arrows 5—5 of FIGURE 4.

FIGURE 6 is a side elevation of the receptacle placed upon a continuous outlet cable preparatory to final securement thereto.

FIGURE 7 is an end view of the receptacle looking in the direction of arrows 7—7 of FIGURE 6.

FIGURE 8 is a plan view of the lever or cover.

FIGURES 8A and 8B are elevations of the lever looking in the directions of arrows 8A—8A and 8B—8B respectively, of FIGURE 8.

FIGURE 9 is a plan view of the case.

FIGURES 9A and 9B are elevations of the case looking in the directions of arrows 9A—9A and 9B—9B, respectively, of FIGURE 9.

FIGURE 10 is a side elevation of one of the side contact means of FIGURE 1.

FIGURE 10A is an end view of the side contact means of FIGURE 10 looking in the direction of arrows 10A—10A.

FIGURE 11 is a side elevation of the grounding contact means.

FIGURE 11A is an end view of the grounding contact means looking in the direction of arrows 11A—11A of FIGURE 11.

FIGURE 12 is a side elevation of the grounding cam.

FIGURE 12A is an end view of the grounding cam looking in the direction of arrows 12A—12A of FIGURE 12.

Now referring to the figures:

Receptacle 10 is of a construction typified by the lever type receptacle illustrated in the aforesaid U.S. Patent 2,924,802 and is adapted to be mounted to a three wire continuous outlet cable of the type illustrated in the aforesaid abandoned application Ser. No. 754,079.

Receptacle 10 includes a molded insulating housing consisting of handle part 11 (FIGURES 8—8B) and hollow case part 12 (FIGURES 9—9B). Mounted within case part 12 are a pair of side contact means 13 and 14

(FIGURES 10 and 10A), a grounding contact means 15 (FIGURES 11 and 11A) and a grounding cam 16 (FIGURES 12 and 12A).

As will become apparent, contact means 13, 14 are each maintained in position by being snap fitted into suitably shaped recesses of case part 12 with blocking formations maintaining contact means 13, 14 in position. Grounding cam 16 is maintained in position by engagement with grounding contact 15 which, in turn, is maintained in position by being snap fitted into suitably shaped recesses in the case 12.

Case 12 is a hollow member generally rectangular in form. The forward surface of case 12 at the rear thereof is provided with central projection 21 extending between cut away portions 22, 23. Handle 11 is generally rectangular member with a plate-like part constituting a cover for case 12 and a plurality of contact operating projections extending into case 12. Handle 11 is provided with end notch 19 which receives case extension 21 cooperating therewith to position the handle and case portions 11, 12. Securement is achieved by roll pin 18 (FIGURE 6) extending through handle aperture 24, through case aperture 25, and into handle hole 26. As clearly seen in FIGURES 4 and 6, roll pin 18 constitutes a pivot about which handle or lever 11 is operable between the closed position of FIGURE 4 and the open position of FIGURE 6. Angle flat surfaces 27 of handle 11 cooperate with surfaces 28 of case cut away portions 22, 23 to limit opening movement of handle 11.

Since contact means 13 and 14 are of identical construction only contact means 14 (FIGURES 10 and 10A) will be described. Contact means 14 is constructed of sheet spring material which is a good electrical conductor and includes U-shaped mounting part 31. The U-arms are reversely bent with the bent parts including camming portions 32, 33 as well as duct conductor engaging portions 34, 35, which in turn are reversely bent from portions 32, 33 respectively. The free edges of portions 34, 35 are serrated in order to facilitate the making of good electrical contact with the conductors of the duct. Web portion of the U is provided with prong engaging contact 36 which is reversely bent so as to extend more or less in the same direction as cam portions 32, 33.

Contact 36 is positioned in alignment with handle aperture 39 so as to be engageable by one of the prongs of a plug cap (not shown) mounted to receptacle 10. Similarly, prong engaging contact 37 of contact means 13 is in alignment with handle aperture 40 and prong engaging grounding contact 38 is in alignment with handle aperture 41. It is noted that the forward surface of handle 11 is provided with recessed areas surrounding apertures 39–41 to facilitate the insertion of plug cap prongs.

Prong engaging contact 38 is a pierced ear struck from the conducting spring sheet material constituting grounding contact 15 (FIGURES 11 and 11A). The edge of contact 15 most remote from the securement point of contact 38 is provided with grounding cam engaging extension 43. Extension 43 is transverse with respect to contact 38, with the free end 44 of the former engaging surface 45 of grounding cam 16 (FIGURES 4 and 6).

Grounding cam 16 (FIGURES 12 and 12A) is constructed of rigid conducting plate material and is connected to case 12 by pivot pin 46 extending through aperture 47 of cam 16. The free ends of pin 46 are confined by case slots 48, 49. Slots 48, 49 are elongated so as to permit a degree of front to back movement for grounding cam 16 thereby providing compensation for manufacturing inaccuracies or deformation of the duct elements. Cam 16 is also provided with follower nose 51 on the side of pivot pin 46 opposite surface 45. Nose 51 is positioned to be engaged by cam surface 52 at the rear of projection 53 extending from the rear surface of handle 11.

The rear surface of handle 11 is also provided with rearward extensions 54–57. The space 59 (FIGURE 8B) between extensions 56, 57 is positioned to provide clearance for a plug prong inserted through handle aperture 41. The side surfaces of projections 54 and 56 engage cam surfaces 32 and 33 respectively of contact means 14 to move contacts 34, 35 outward when handle 11 is in the closed position of FIGURE 4. Similarly, the side portions of extensions 55 and 57 engage the cam surfaces of the other contact means 13 to move its duct conductor engaging contact portions 61, 62 (FIGURE 3) into engagement with a duct conductor when handle 11 is in the closed position of FIGURE 4.

To secure receptacle 10 to continuous outlet cable 70 (FIGURES 5 and 7) handle 11 is moved to the open position of FIGURE 6 by grasping handle lip 98. Case 12 is provided with recess 99 aligned with lip 98 to facilitate operation of handle 11. With handle 11 in open position contact means portions 34, 35, 61, 62 are biased inwardly to the positions shown in FIGURE 7 wherein they are disposed inwardly of the duct housing lips 71, 72. Further, extension 43 of grounding contact means 15 biases grounding cam 16 in a clockwise direction with respect to FIGURE 6 with this motion being limited by the engagement of cam edge surface 69 with an internal formation of case 12. This permits case 12 to be mounted to duct housing 73 with polarizing rib 74 of duct 70 being received by notches 68 in the rear edge of case 12 at the ends thereof.

When handle 11 is pivoted to closed position cam projections 56, 57 move contact means portions 34, 62 in diverging directions into engagement with the hot conductors 76, 77 disposed beneath duct housing lip 71, 72, respectively. In addition, cam projections 54, 55 move contact means portions 35 and 61 in diverging directions into engagement with conductors 76, 77, respectively. When receptacle 10 is initially placed upon duct 70 grounding cam 16 rests upon the forward surface of duct grounding conductor 78 positioned adjacent to polarizing rib 74. As cover 11 is brought to closed position, cam surface 52 thereof engages grounding cam nose 51 and rotates cam 16 in a counterclockwise direction with respect to FIGURE 4, moving the teeth 66, 67 of cam 16 across the exposed surface of conductor 78. This movement of teeth 66, 67 scrapes through all paint or dirt accumulations on conductor 78 to assure good electrical contact between cam 16 and grounding conductor 78. Extension 43 of grounding contact means 15 maintains spring pressure on cam 46 to insure that contact pressure is maintained.

With handle 11 in the closed position it is seen that all four contact means portions 34, 35, 61, 62 are disposed beneath the lips of duct housing 73. The provision of four contact means extensions provides firm mechanical securement for receptacle 10 to duct 70 so as to prevent accidental mounting should a plug cap be jerked while attempting to disconnect the latter from receptacle 10.

When handle 11 is moved to the open position of FIGURE 6, the side contact means are self biased to their positions of FIGURE 7 so as to permit dismounting of receptacle 10 from duct 70. It should be apparent that receptacle 10 cannot be mounted to or dismounted from duct 70 when a plug prong is mounted to receptacle 10. That is, in order for a plug prong to be mounted to receptacle 10, cover 11 must be closed. When cover 11 is closed contact means portions 34, 35, 61, 62 are so positioned that receptacle 10 cannot be mounted to duct 70, and if receptacle 10 is in mounted position, it cannot be dismounted from duct 70.

Thus, this invention provides a novel construction for a receptacle adapted to be mounted to a continuous outlet cable at any point along the length thereof. Receptacle construction is such that more reliable mechanical and electrical connections to the duct are assured.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows.

1. A removable receptacle adapted to be operatively connected to a continuous outlet duct; said receptacle including an insulating housing comprised of a case and an operating member, a first and a second contact means mounted within said case; each of said contact means having a first and a second leg each with an extension; said extensions of said first contact means engageable with a duct conductor and said extensions of said second contact means engageable with a different duct conductor; biasing means urging said first legs toward one another and said second legs toward one another to retracted positions wherein said receptacle is mountable to and dismountable from a continuous outlet cable; said operating member being movable between a first and a second position relative to said case; said legs being in retracted position when said operating member is in said first position; said operating member having means which, when said operating member is moved from said first to said second position, moves said first legs in opposite directions and said second legs in opposite directions to extended positions wherein said extensions are engageable with current carrying conductors of a continuous outlet cable, said operating member being elongated and positioned in front of said case; pivot means mounting said operating member at one end thereof to said case for movement between said first and said second positions; said operating member, when in said first position, having its other end more remote from said case then when said operating member is in said second position, a grounding contact means mounted in said case; biasing means urging a portion of said grounding contact means to a normal position; said means of said operating member moving said portion to a grounding position when said operating member is in said second position, said operating member constituting a cover for said case; said cover having a first and a second prong receiving aperture; said first and said second apertures being aligned with said first and said second contact means, respectively, when said cover is in said second position; said cover also having a third prong receiving aperture aligned with another portion of said grounding contact means when said cover is in said second position.

2. A receptacle as set forth in claim 1 in which there is a first pivot intermediate the ends of said operating member and about which said operating member moves between said first and said second positions and a second pivot, generally parallel to and spaced from said first pivot, about which said portion of said contact means moves between said grounding normal and said grounding positions.

3. A receptacle as set forth in claim 2 in which the ends of said second pivot are disposed within elongated slots of said case, said biasing means also urging said second pivot toward the rear of said slots, said another portion of said grounding contact means and said biasing means being integrally formed of resilient conducting sheet material, said portion of said grounding contact means formed of relatively rigid conducting material.

4. A removable receptacle adapted to be operatively connected to a continuous outlet duct; said receptacle including an insulating housing comprised of a case and an operating member, a first and a second contact means mounted within said case; each of said contact means having a leg with an extension engageable with a different conductor of a duct; biasing means urging said legs toward one another to retracted positions wherein said receptacle is mountable to and dismountable from a continuous outlet cable; said operating member being movable between a first and a second position relative to said case; said legs being in retracted position when said operating member is in said first position; said operating member having means which, when said operating member is moved from said first to said second position, moves said legs in opposite directions to extended positions wherein said extensions are engageable with current carrying conductors of a continuous outlet cable, a rigid pin means in direct engagement with said case, a grounding contact means mounted in said case, biasing means urging a portion of said grounding contact means to a normal position, said portion mounted to said pin means, said means of said operating member also pivoting said portion about said pin means to a grounding position when said operating member is in said second position.

5. A receptacle as set forth in claim 4 in which there is a first pivot about which said operating member moves between said first and said second positions, said pin means being generally parallel to said first pivot.

6. A receptacle as set forth in claim 5 in which the ends of said pin means are disposed within elongated slots of said case; means biasing said second pivot toward the rear of said slots.

7. A receptacle as set forth in claim 5 in which said operating member constitutes a cover for said case; said cover having a first and a second prong receiving aperture; said first and said second apertures being aligned with said first and said second contact means, respectively, when said cover is in said second position; said cover also having a third prong receiving aperture aligned with another portion of said grounding contact means when said cover is in said second position.

8. A removable receptacle adapted to be operatively connected to a continuous outlet duct; said receptacle including an insulating housing comprised of a case and an operating member, a first and a second contact means mounted within said case; each of said contact means having a first and a second leg each with an extension, said extensions of said first contact means engageable with a duct conductor and said extensions of said second contact means engageable with a different duct conductor; biasing means urging said first legs toward one another and said second legs toward one another to retracted positions wherein said receptacle is mountable to and dismountable from a continuous outlet cable; said operating member being movable between a first and a second position relative to said case; said legs being in retracted position when said operating member is in said first position; said operating membering having means which, when said operating member is moved from said first position; said operating member having means posite directions and said second legs in opposite directions to extended positions wherein said extensions are engageable with current carrying conductors of a continuous outlet cable, said housing having a first and a second plug prong receiving aperture, each of said contact means also having a section aligned with said apertures to be engaged by plug prongs inserted into said apertures when said operating member is in said second position, each of said contact means constructed of conducting sheet material and having its said section positioned intermediate its said first and said second legs.

References Cited by the Examiner

UNITED STATES PATENTS

| 2,437,579 | 3/1948 | Wilson | 339—21 |
| 2,924,802 | 2/1960 | Platz et al. | 339—21 |
| 3,081,442 | 3/1963 | Platz | 339—21 X |

EDWARD C. ALLEN, *Primary Examiner.*

PATRICK A. CLIFFORD, *Examiner.*

UNITED STATES PATENT OFFICE
CERTIFICATE OF CORRECTION

Patent No. 3,299,391 January 17, 1967

John A. Herrmann et al.

It is hereby certified that error appears in the above numbered patent requiring correction and that the said Letters Patent should read as corrected below.

Column 5, line 55, after "said", second occurrence, insert -- grounding --; line 56, strike out "grounding"; column 6, line 51, for "membering" read -- member --; line 53, after "first" insert -- to said second --; line 53, for "; said operating member having means" read -- , moves said first legs in --; line 54, for "posite" read -- opposite --.

Signed and sealed this 14th day of November 1967.

(SEAL)
Attest:

Edward M. Fletcher, Jr.
Attesting Officer

EDWARD J. BRENNER
Commissioner of Patents